Nov. 4, 1941.　　　J. G. KREYER　　　2,261,833
RUBBER VALVE STEM
Filed May 2, 1939
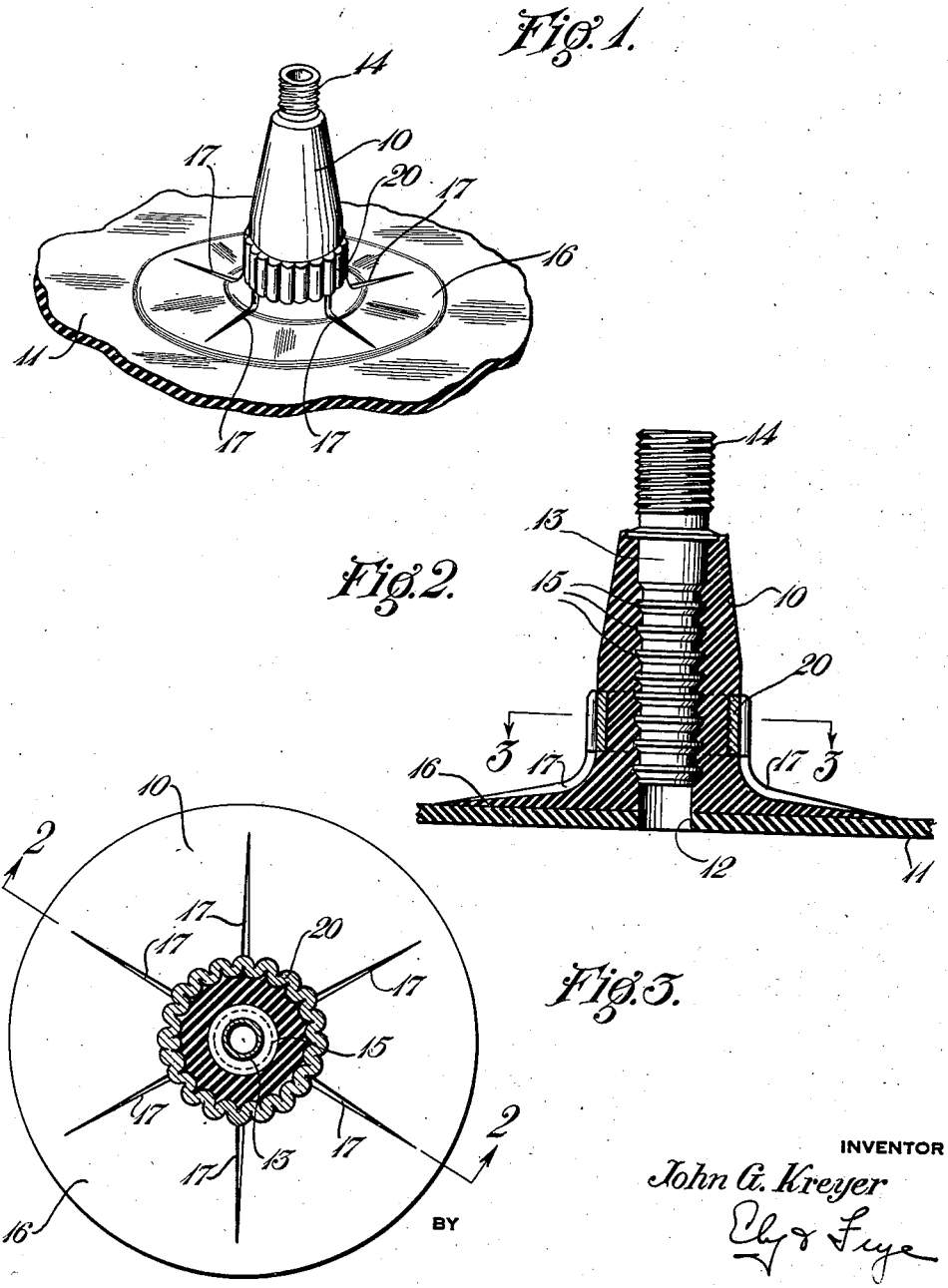
INVENTOR
John G. Kreyer
ATTORNEYS Patented Nov. 4, 1941

2,261,833

UNITED STATES PATENT OFFICE 2,261,833

RUBBER VALVE STEM

John G. Kreyer, Akron, Ohio, assignor to The Firestone Tire & Rubber Company, Akron, Ohio, a corporation of Ohio Application May 2, 1939, Serial No. 271,298

2 Claims. (Cl. 152—429)

This invention relates to rubber valve stems such as are used on the inner tubes of pneumatic tire casings.

The invention is of primary utility in its application to the valve stems of tires used on certain makes and sizes of agricultural vehicles, especially tractors. These tractors require additional weight to produce adequate driving traction, said weight conveniently being provided by filling the tires of the vehicle with a suitable liquid. In the winter season, at least, said liquid requires to be of a non-freezing nature, and a calcium chloride solution commonly is used because of its low cost and low freezing point. It is characteristic of calcium chloride, however, to have a corrosive effect upon brass, and when used for the purpose specified it frequently has attacked the brass inserts that contain the valve mechanism in rubber valve stems. As the result of such corrosion, the chemical bond between the metal inserts and the rubber thereabout has been destroyed, and frequently the inserts have been blown entirely out of the rubber stems.

The chief objects of the invention are to provide a valve stem construction of the character mentioned wherein the metal insert will be firmly retained in place against the pressure of liquid within the tire; to provide simple and economical means for retaining the metal insert in place; to provide valve stem insert-retaining means that will resist the corrosive action of liquid within the tire; and to provide valve stem insert-retaining means that will function mechanically even though the chemical bond between the rubber and the metal insert is destroyed. Other objects will be manifest as the description proceeds.

Briefly stated, the invention in the improved rubber valve stem resides in the provision of a local region or zone of rubber under compressive stress, which region is concentric with the axis of the valve stem and circumscribes the metal insert therein.

Of the accompanying drawing:

Figure 1 is a perspective view of a rubber valve stem constituting one embodiment of the invention, and a fragment of inner tube to which it is attached;

Figure 2 is a diametric section therethrough on a larger scale, on the line 2—2 of Figure 3; and Figure 3 is a section on the line 3—3 of Figure 2.

Referring to the drawing, there is shown a rubber valve stem 10 of conventional or preferred design, which valve stem may be bonded to the usual rubber inner tube 11 concentric with a port or aperture 12 therein. Mounted within the stem 10 is a tubular metal insert 13 that is positioned at the axis of the stem and has the usual threaded portion 14 projecting from the free end thereof, remote from the tube wall 11. Within the valve stem the insert is formed with the usual longitudinal series of circumferential flanges 15, 15 that function to provide a mechanical interlock of rubber and metal for assisting in retaining the insert in the stem. The insert is mounted in the rubber stem structure before the latter is vulcanized, the vulcanizing of the rubber effecting a chemical bond or adhesion of the rubber to the metal. If this chemical bond between the rubber and metal is destroyed by reason of the corrosive action of the liquid carried in the inner tube, the normal mechanical interlock between the flanges 15 and the rubber of the stem is not sufficient to retain the insert within the stem against the pressure of the liquid within the inner tube, even when the vehicle upon which the inner tube is mounted is not in use. Within the insert 13 is the usual valve mechanism or "insides" (not shown). The valve stem 10 is formed with the usual base flange 16 that is adhered to the inner tube structure 11, there being a substantial fillet at the juncture of the stem and said flange portion 16. The rubber structure may be formed with a plurality of radial ribs 17, 17 extending from the flange portion 16 to the body of the stem for the purpose of facilitating the escape of air from between the tire rim and the inner tube during the inflating of the latter.

For putting a local region of the rubber stem 10 under compressive stress, a constricting annular band 20 is employed, said band encircling the stem just above the fillet at the juncture of the stem and base flange 16, and also encircling the insert 13 within the stem adjacent the inner end of said insert. Preferably the band 20 is of axially corrugated construction so as to be constrictable, and any suitable or preferred means may be employed for constricting it about the valve stem. The band 20 is applied to the rubber valve stem after the latter is vulcanized, with the result that the annular zone of rubber between the band and the insert is put under compressive stress, and so grips the insert more firmly than it otherwise would.

The arrangement is such that corrosion of the outer surface of the insert 13, progressing outwardly from the inner end thereof, is greatly retarded by the zone of rubber under compressive stress. Furthermore, if eventually the entire outer surface of the insert becomes corroded, so as to destroy the chemical bond between the insert and the rubber of the stem, the pressure of the rubber in the compressed zone upon the flanged outer face of the insert will provide a mechanical interlock of rubber and metal of sufficient strength to resist any tendency of the pressure of fluid within the tube to eject the insert.

The invention is of simple and economical construction, it is applicable to valve stems of standard construction simply by the addition of the constriction ring, and it achieves the several advantages set out in the foregoing statement of objects.

Modification may be resorted to without departing from the spirit of the invention, or the scope thereof as defined by the appended claims.

What is claimed is:

1. A rubber valve stem comprising an axially disposed tubular metal insert therein, said insert being chemically bonded to the rubber by vulcanization, and means locally circumscribing the stem and applying constricting pressure to the rubber between itself and said insert, at the inner end portion of the latter, as a means for retarding corrosion of the exterior of the insert.

2. A rubber valve stem for inner tubes, said valve stem comprising an axially disposed tubular metal insert therein, said insert being chemically bonded to the rubber by vulcanization, and a metal ring mounted upon the exterior of the stem concentrically of the insert adjacent the inner end of the latter, said ring being constricted so as to maintain the rubber between it and the insert under compressive stress as a means for retarding corrosion of the exterior of the insert by fluid from within the tube.

JOHN G. KREYER.